United States Patent [19]
McLeod

[11] 3,936,266
[45] Feb. 3, 1976

[54] TRIHALO MONOAZO DYESTUFFS
[75] Inventor: John H. McLeod, Tonawanda, N.Y.
[73] Assignee: Allied Chemical Corporation, New York, N.Y.
[22] Filed: Feb. 11, 1974
[21] Appl. No.: 441,688

[52] U.S. Cl. ................................. 8/26; 260/198
[51] Int. Cl.² ............... C09B 27/00; C09B 45/48; C07C 107/08; D06P 1/06
[58] Field of Search ................................. 8/26, 25

[56] References Cited
UNITED STATES PATENTS
| | | | |
|---|---|---|---|
| 3,272,586 | 9/1966 | Frisch | 8/26 |
| 3,503,955 | 5/1970 | Genta | 260/207 |
| 3,520,871 | 7/1970 | Zanella | 260/207 |

*Primary Examiner*—Donald Levy
*Assistant Examiner*—A. L. Clingman
*Attorney, Agent, or Firm*—Anthony J. Stewart; Jay P. Friedenson

[57] ABSTRACT

Monoazo dyes exhibiting excellent wash- and lightfastness and being essentially insensitive to acid having the formula

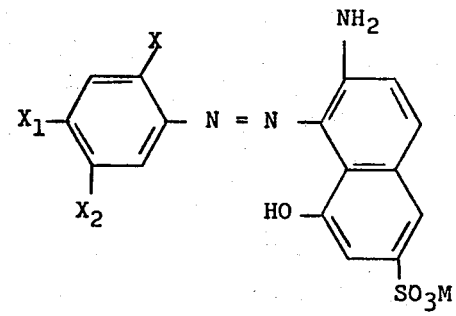

wherein X, $X_1$ and $X_2$ are chlorine or bromine, and M is an alkali metal or hydrogen.

2 Claims, No Drawings

TRIHALO MONOAZO DYESTUFFS

This invention relates to dyestuffs. More particularly this invention relates to monoazo dyestuffs particularly suitable as red dyes for nylon articles.

The use of azo dyestuffs containing a sulfonic acid group for the dyeing of fibers, including artificial fibers such as nylon, has been known for some time. However, difficulty has been encountered in employing conventional red dyes in the dyeing of nylon fibers since the conventional dyes do not impart the desired lightfastness, shade, strength, etc. Furthermore many of the known red dyes are sensitive to acid which is undesirable and results in unacceptable shade alterations. Several of the monoazo dyestuffs employed hereto fore for dyeing nylon articles a red shade have been considered uneconomical and undesirable since they are relatively expensive and produced from raw materials and processes which are in themselves relatively expensive. A number of such dyes are derivatives of aminobenzotrifluoride which is not only quite expensive but presents undesirable processing hazards.

It is therefore an object of this invention to provide a monoazo red dye suitable for nylon fibers.

It is a further object of this invention to provide an economical monoazo dyestuff which will dye nylon fibers red.

These and other objects will become apparent from the description which follows.

In accordance with this invention there is provided a monoazo dyestuff having the formula

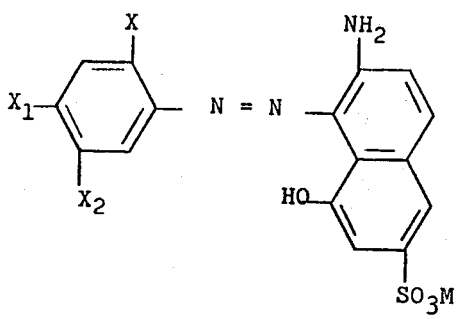

wherein X, $X_1$ and $X_2$ are chlorine or bromine, and M is an alkali metal or hydrogen. Nylon fibers dyed with compounds having the above formula exhibit good lightfastness, washfastness and strength as well as acceptable barré and exhaust.

The dyestuffs of this invention are obtained by diazotizing a trihalogenated, non-sulfonated primary amine and coupling in an acid medium to Gamma acid or its alkali metal salts.

Suitable non-sulfonated primary amines which may be employed in the production of the dyestuff of this invention may be represented by the formula

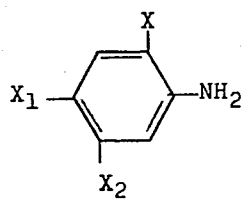

wherein X, $X_1$ and $X_2$ are chlorine or bromine.

Exemplary of compounds coming within the general formula given above are 2,4,5-trichloroaniline
2,4,5-tribromoaniline
4,5-dibromo-2-chloroaniline
2,4-dichloro-5-bromoaniline
2,5-dichloro-4-bromoaniline and other like compounds.

The primary amines are diazotized in the usual manner, e.g., with sodium nitrite, and thereafter coupled with Gamma acid, i.e., 2-amino-8-hydroxy naphthalene-6-sulfonic acid, or its alkali metal, i.e., lithium, sodium or potassion, salts. In order that the coupling of the diazotized amine and the Gamma acid compound occur at the 1-position of the acid, it is necessary to carry out the coupling reaction in a mineral acid medium, that is, at a pH of below about 3.5. Under less acid conditions, or in a neutral or basic medium, the coupling does not occur at this position and the desired product is not obtained. To obtain the characteristic of insensitivity to acid, it is necessary that the coupling occur in the 1-position of the Gamma acid and it is also necessary that at least one halogen atom on the aniline be ortho to the amine group. The exact mechanics of the molecular acid-insensitivity is not completely understood, but it is known that coupling in a different position, or the absence of an ortho halogen on the aniline, results in a product which exhibits substantial shade alteration upon exposure to acid.

As indicated above, the coupling of the diazotized aniline and the Gamma acid is carried out in a mineral acid medium. Since compounds in which M is an alkali metal, specifically sodium, are preferred, the Gamma acid is first dissolved in, e.g., caustic soda liquor. The amount of liquor being just sufficient to dissolve the acid. Thereafter, the solution is added to the solution of the diazotized compound in the presence of a mineral acid, for example, HCl. The presence of the mineral acid has a tendency to convert the Gamma acid salt back to the acid and, therefor, after the coupling is completed, additional caustic soda liquor is added to convert any acid groups present on the monoazo dye, to the sodium salt.

Nylon articles, preferably fibers, are dyed in a known manner, e.g., by immersing the fibers into a hot, aqueous solution of the dye. The articles so treated contain between 0.01 and 2.0, preferably 0.25 to 1.5, weight percent of the dye, depending on the desired red shade, exhibit good lightfastness, barré and exhaust and are insensitive to acid, that is, the shade is not measurably affected by exposure to an acid medium.

The preferred dyestuff of the present invention is that in which diazotized 2,4,5-trichloroaniline is coupled with the sodium salt of Gamma acid, i.e., a monoazo dye having the formula

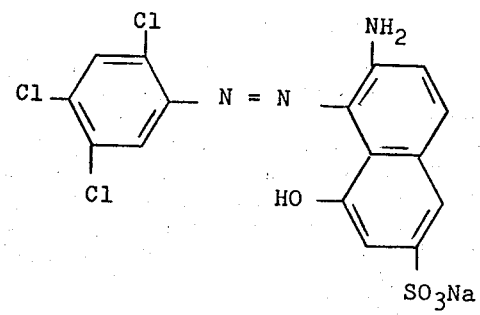

A particular advantageous feature of the dyes of this invention is their ability to be blended with other dyes for the purpose of obtaining the desired shade. At the present, a commercially acceptable nylon red dye, from a shade standpoint is C.I. Acid Red 266, sold under the trade name Nylomine Red A2BS. It has been found that the shade of this dye can be matched with a mixture of about 20 weight percent

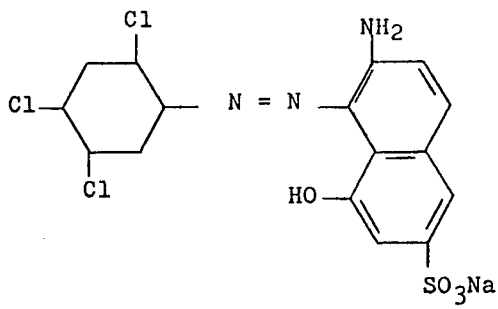

with about 80 weight percent of the known dye

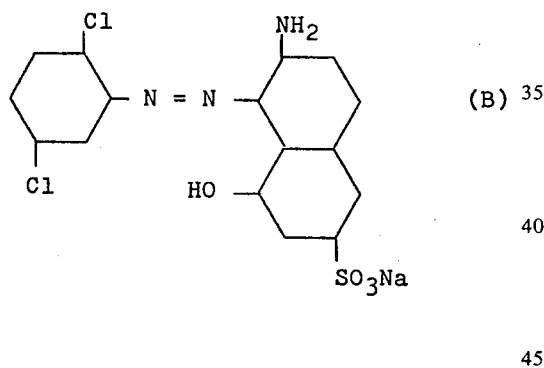

while the mixture exhibits the other properties of the dye of this invention, i.e. lightfastness, washfastness, strength, barré and exhaust. Similarly, other shades of red can be obtained by varying the percentage of these two components. In accordance with this invention from 20 to 80 percent of dyestuff (A) can be mixed with 80 to 20 percent of dyestuff (B) to obtain desirable shading.

The invention will be more fully understood with reference to the following example which is given by way of illustration only.

EXAMPLE 1

To a solution of 480 cc's of water and 60 cc's of 20° Be hydrochloric acid under agitation, there is added a warm solution of 0.24 mols (47.2 grams) of 2,4,5-trichloroaniline in 150 cc's of glacial acetic acid. The mixture is thereafter cooled, with ice to 5°C. 60 cc's of a 30% solution of sodium nitrite is rapidly added to diazotize the amine and the resultant mixture is agitated for 1 hour at 5° to 10°C, resulting in a clear solution.

A solution of the sodium salt of Gamma acid is prepared by adding about 26 cc's of 50% caustic soda liquor to a solution of 780 cc of water containing 57.5 grams (0.24 mol) of Gamma acid. The caustic soda liquor was just enough to dissolve the Gamma acid.

The solution of the sodium salt of Gamma acid is added to the diazotized amine over a period of 30 minutes while maintaining the temperature below 15°C. The coupling is then permitted to continue for about 12 hours without further temperature control while agitating the mixture.

About 140 cc's of 50% caustic soda liquor is added to the solution and the solution is heated to 85°C to crystallize the monoazo dyestuff. The solution is then agitated at about 60°C and filtered with recovery of the monoazo dye.

A 0.5 gram portion of the monoazo dyestuff so produced was dissolved in 200 ml of boiling distilled water. The dyestuff dissolved. A nylon skein was introduced into the dye solution, held at a temperature of about 200°F for 45 minutes, and thereafter removed and dried. The nylon so dyed was a bright red and exhibited good shade and strength, had good reserve, barré and exhaust and exhibited good lightfastness and was essentially non-sensitive to acid.

The dyed fabric was immersed in a 5% HCl solution for 15 minutes. After removal from the solution the color shade was determined to be unaltered.

What is claimed is:

1. As a dye composition, a mixture of from about twenty to 80 weight percent of a compound having the formula

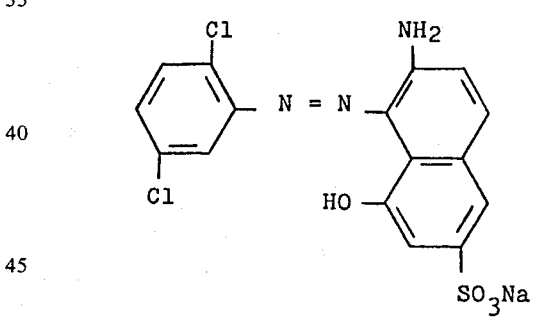

and from about 80 to 20 weight percent of a compound having the formula

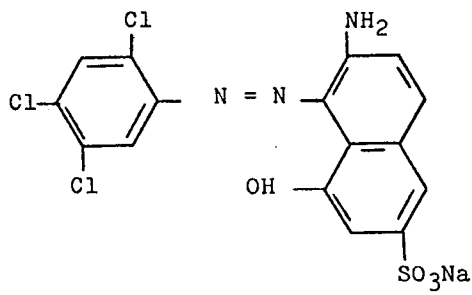

2. As a dye composition, a mixture of about 20 weight percent of a compound having the formula
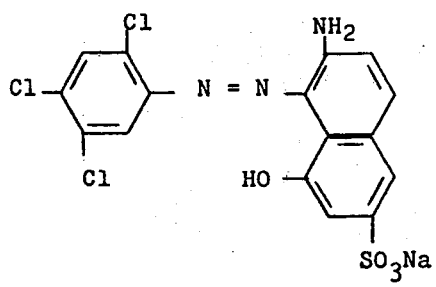
and about 80 weight percent of a compound having the formula
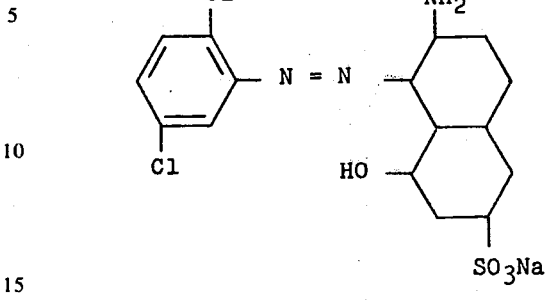
* * * * *

UNITED STATES PATENT AND TRADEMARK OFFICE
CERTIFICATE OF CORRECTION

PATENT NO. : 3,936,266
DATED : February 3, 1976
INVENTOR(S) : John H. McLeod

It is certified that error appears in the above-identified patent and that said Letters Patent are hereby corrected as shown below:

Column 4, line 30 "1. As a dye composition, a mixture of from about twenty to 80 weight percent of a compound having the formula

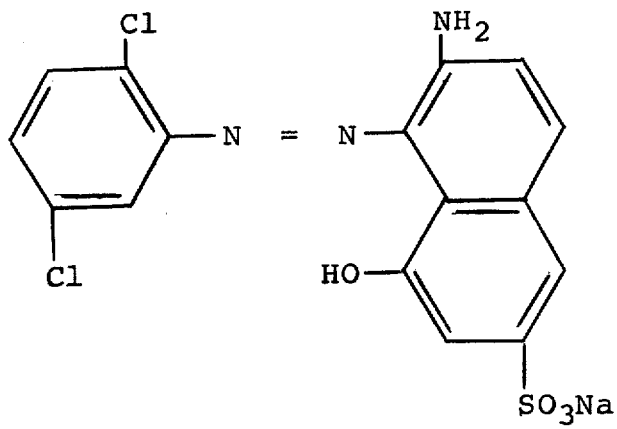

and from about 80 to 20 weight percent of a compound having the formula

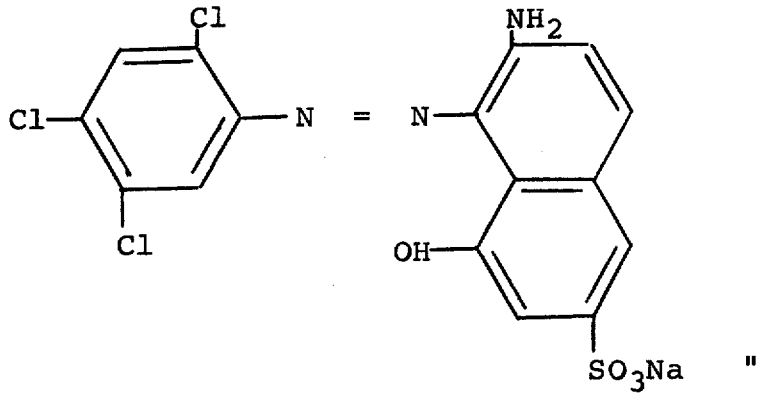
"

UNITED STATES PATENT AND TRADEMARK OFFICE
CERTIFICATE OF CORRECTION

PATENT NO. : 3,936,266
DATED : February 3, 1976
INVENTOR(S) : John H. McLeod

It is certified that error appears in the above–identified patent and that said Letters Patent are hereby corrected as shown below:

should be --1. As a dye composition, a mixture of from about twenty to 80 weight percent of a compound having the formula

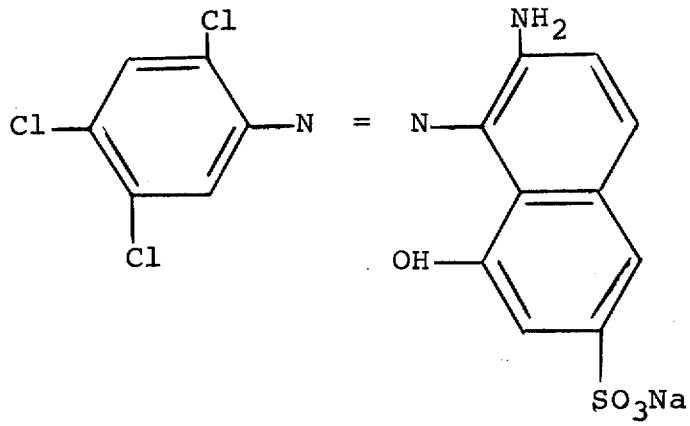

and from about 80 to 20 weight percent of a compound having the formula

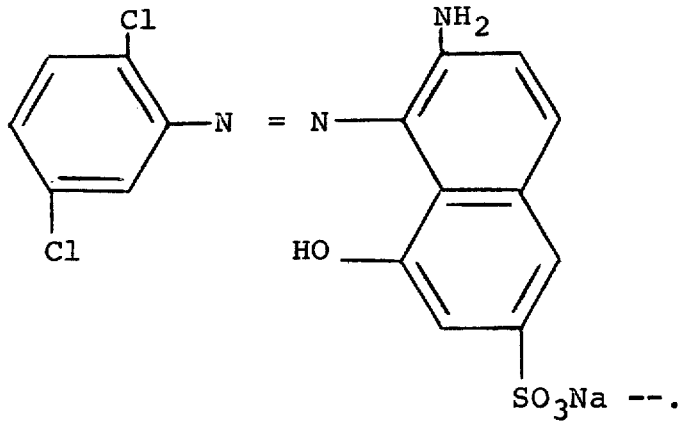

--.

Signed and Sealed this twenty-ninth Day of June 1976

[SEAL]

Attest:

RUTH C. MASON
Attesting Officer

C. MARSHALL DANN
Commissioner of Patents and Trademarks